(12) United States Patent
Schmidt

(10) Patent No.: US 11,873,209 B2
(45) Date of Patent: Jan. 16, 2024

(54) FILLING ADAPTER FOR FILLING VEHICLES AT ASSEMBLY LINES IN THE AUTOMOTIVE INDUSTRY

(71) Applicant: DÜRR SOMAC GMBH, Stollberg (DE)

(72) Inventor: Karlheinz Schmidt, Schneeberg (DE)

(73) Assignee: DÜRR SOMAC GmbH, Stollberg (DE)

( * ) Notice: Subject to any disclaimer, the term of this patent is extended or adjusted under 35 U.S.C. 154(b) by 0 days.

(21) Appl. No.: 17/770,268

(22) PCT Filed: Sep. 24, 2020

(86) PCT No.: PCT/DE2020/000218
§ 371 (c)(1),
(2) Date: Apr. 19, 2022

(87) PCT Pub. No.: WO2021/078314
PCT Pub. Date: Apr. 29, 2021

(65) Prior Publication Data
US 2022/0388833 A1 Dec. 8, 2022

(30) Foreign Application Priority Data

Oct. 21, 2019 (DE) .................... 10 2019 007 352.5

(51) Int. Cl.
*B67D 7/42* (2010.01)
*B60H 1/00* (2006.01)
*B67D 7/02* (2010.01)

(52) U.S. Cl.
CPC .......... *B67D 7/42* (2013.01); *B60H 1/00585* (2013.01); *B67D 7/0288* (2013.01)

(58) Field of Classification Search
CPC ..... F16N 21/04; B65G 69/183; B67D 7/0288; F16L 37/088; F16L 37/0887; F25B 2345/006; F25B 45/00
See application file for complete search history.

(56) References Cited

U.S. PATENT DOCUMENTS 6,343,630 B1 * 2/2002 Dubinsky ........... F16L 37/0848
251/149.6
6,530,605 B1 * 3/2003 Weh ........................ F16L 37/20
285/308

(Continued)

FOREIGN PATENT DOCUMENTS

DE 102007063487 A1 7/2009
DE 102015003623 A1 10/2015
DE 102015001767 A1 8/2016

OTHER PUBLICATIONS

International Search Report (English and German) and Written Opinion of the ISA (German) issued in PCT/DE2020/00218, dated Mar. 2, 2021; ISA/EP.

*Primary Examiner* — Timothy P. Kelly
(74) *Attorney, Agent, or Firm* — Harness, Dickey & Pierce, P.L.C.

(57) ABSTRACT

The disclosure provides a filling adapter for filling vehicles with various operating materials which are fed from filling systems via connecting lines and filling adapters into circuits and containers of the vehicles. The disclosure provides a mechanical clamping element for such a filling adapter that has a lower mechanical load on the filling port than the known clamping claws or balls. The clamping element has a partially circular contour with a cross-section which, starting from a lower and flat base surface, merges upwards into two side surfaces which are arranged at right angles to the base surface and run parallel to one another, wherein the two side surfaces each merge at their end section arranged (Continued)

Figure 1:
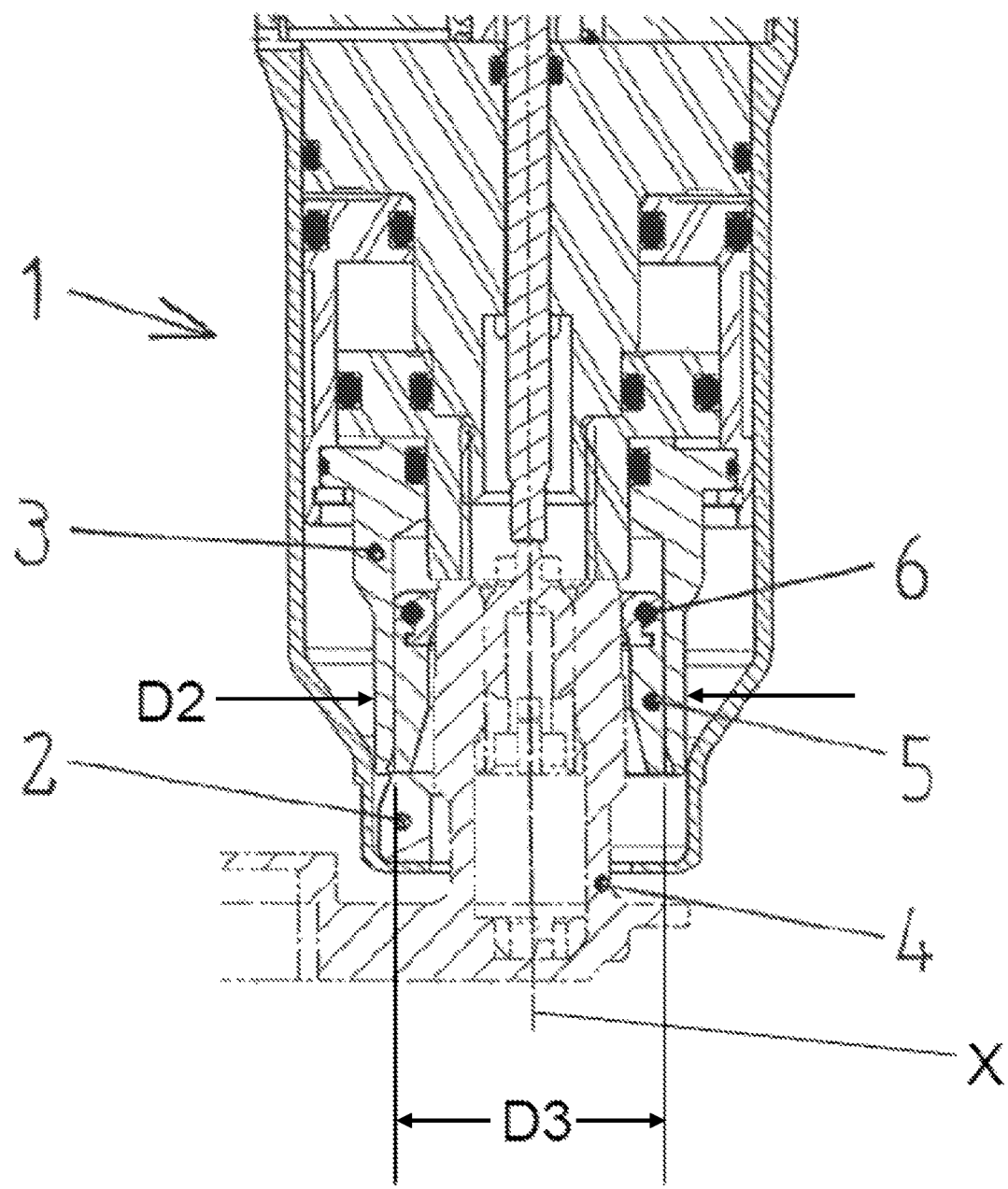

opposite the base surface into an actuating surface that runs obliquely upwards and inwards.

1 Claim, 3 Drawing Sheets

(56) References Cited

U.S. PATENT DOCUMENTS

| | | | |
|---|---|---|---|
| 10,525,820 B2* | 1/2020 | Takezawa | H01M 8/0656 |
| 2003/0226598 A1 | 12/2003 | Swinford | |
| 2013/0327439 A1* | 12/2013 | Pitney | F17C 5/06 |
| | | | 141/346 |
| 2018/0162194 A1 | 6/2018 | Selbmann et al. | |

* cited by examiner

FILLING ADAPTER FOR FILLING VEHICLES AT ASSEMBLY LINES IN THE AUTOMOTIVE INDUSTRY

CROSS-REFERENCE TO RELATED APPLICATIONS

This application is a U.S. National Phase Application under 35 U.S.C 371 of International Application No. PCT/DE2020/000218, filed on Sep. 24, 2020, which claims the benefit of German Patent Application No. 10 2019 007 352.5, filed on Oct. 21, 2019. The entire disclosures of the above applications are incorporated herein by reference.

FIELD

The disclosure relates to a filling adapter for filling vehicles on assembly lines in the automotive industry, on which vehicles are filled with various operating materials which are fed from filling systems via connecting lines and filling adapters into circuits and containers of the vehicles, wherein the filling adapter has at least one clamping element which can be actuated by means of a pneumatically or mechanically controlled clamping piston in such a manner that it is clamped onto a filling port of the circuit or container to be filled for the filling operation and is held in this clamping position during filling.

BACKGROUND

This section provides background information related to the present disclosure which is not necessarily prior art.

In the automotive industry, new vehicles are filled with various operating materials at the manufacturers' assembly lines. These operating materials (e.g. fuel, coolant, and refrigerant) are fed into the vehicle circuits and containers to be filled in predominantly automated processes starting from a filling system via connecting lines and filling adapters.

The filling adapters are mainly equipped with mechanical clamping elements which are operatively connected to pneumatically or mechanically actuatable clamping pistons. For the filling operation, these clamping elements are clamped onto specifically designed component sections of the containers to be filled. These clamping elements can be designed as clamping claws according to DE 10 2007 063 487 A1 and DE 10 2015 003 623 A1, for example. Alternative embodiments are known, for example, from US 2003 022 6598 A1 and DE 10 2015 001 767 A1, in which the clamping elements are designed as balls.

Such filling adapters with clamping claws or balls as clamping elements have proven successful in principle. However, clamping claws or balls result in high mechanical loads on the associated filling port. This problem is particularly relevant if clamping elements made of hard materials (e.g. balls made of metal) are paired with a filling port made of soft materials (e.g. aluminum or plastic).

Investigations have shown that in such embodiments, scoring, indentations and similar surface defects can occur on the filling port with increasing service life, which defects can impair the functionality of the filling adapter due to leaks and the like. This may be problematic because the filling adapters are often designed for maintenance intervals of 10,000 to 20,000 filling operations, such that premature wear of the filling port can result in significant disruptions to the operation of the entire assembly line.

A typical application in this respect is adapters for filling air conditioning systems with a refrigerant. For such filling adapters, balls or claws have been used so far for clamping onto the filling port. Since the filling ports are increasingly made of plastic, visible marks are left on the filling port when balls or claws are used as clamping elements. Irrespective of whether this actually results in functional deficiencies, this is not acceptable to the user. Therefore, the aim is for the clamping elements to result in a lower mechanical load on the associated filling ports. However, this can hardly be implemented with designs known from prior art.

SUMMARY

This section provides a general summary of the disclosure, and is not a comprehensive disclosure of its full scope or all of its features.

It is the aim of the disclosure to create a mechanical clamping element for a filling adapter which has a lower mechanical load for the filling port than the previously used clamping claws or balls, without impairing the locking of the filling adapter in its adapted position on the vehicle container, which is required for a proper filling operation. In particular, the disclosures provides a clamping element for use in filling vehicle air conditioning systems with refrigerant.

This aim is achieved in that the clamping element has a partially circular contour with a cross-section which, starting from a lower and flat base surface, merges upwards into two side surfaces which are arranged at right angles to the base surface and run parallel to one another. These two side surfaces each merge at their end section, which is arranged opposite to the base surface, into an actuating surface running obliquely upwards and inwards.

The clamping element is dimensioned such that it has a diameter on its outer side surface which, in relation to the associated section of the clamping piston, is smaller than the side surface of the clamping piston facing away from the central longitudinal axis of the filling port and which is larger than the side surface of the clamping piston facing towards the central longitudinal axis of the filling port.

Furthermore, the clamping element is arranged in the filling adapter in such a manner that the clamping piston, which can be moved in the direction of the base surface of the clamping element, first impacts the actuating surface, which runs obliquely upwards and inwards from the outer side surface of the clamping element, with a run-off slope formed on the clamping piston and then, in the further course of movement, slides along said obliquely running actuating surface. At the same time, the actuating surface, which runs obliquely upwards and inwards from the inner side surface of the clamping element, impacts a run-off slope formed on the filling port and slides along the latter. The clamping piston then slides along the outer side surface of the clamping element, which adjoins vertically downwards.

Initial investigations by the applicant using a clamping element according to the disclosure have revealed that the specific design as an approximately ¾ ring with run-up chamfers for the clamping piston and for the filling port results in particularly good sealing. The filling port is subjected to much less mechanical stress than with the balls or claws previously common as clamping elements. The clamping element is designed as a cost-effective wear part which, despite its long service life, can be replaced in a simple manner and with little effort, if required.

This means that a clamping element for a filling adapter is now available that has a lower mechanical load on the filling port than the clamping claws and balls commonly used to date. The clamping element is suitable for filling adapters for different operating materials, wherein a preferred application is the filling of vehicle air conditioning systems with a refrigerant.

The main advantages of the disclosure compared to previously common variants are the elimination of clamping balls and clamping claws, reduced manufacturing, assembly and maintenance outlay, and prevention of damage to the vehicle circuits and containers to be filled.

In one embodiment, the closed circular ring contour comprises an angle of approximately 280° on the clamping element configured as a partially circular ring. Thus, both a high clamping force acting on the filling port in the clamping position and unhindered movement of the assemblies in the unclamped position are achieved.

The upward and inward sloping actuating surfaces on the clamping element cause the clamping piston to slide smoothly on the clamping element and the filling port to deflect sufficiently upward, such that an effective seal is achieved on the container to be filled. This sealing is additionally supported by a seal carrier arranged above the clamping element on the inner contour of the clamping piston, on which carrier a container seal can be supported.

The clamping element and the filling adapter can be made of different materials. Irrespective of the specific material, the proposed design results in significantly lower mechanical stresses on the assemblies that are in operative contact with each other during the filling operation than when balls or gripping claws made of metal are used as clamping elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
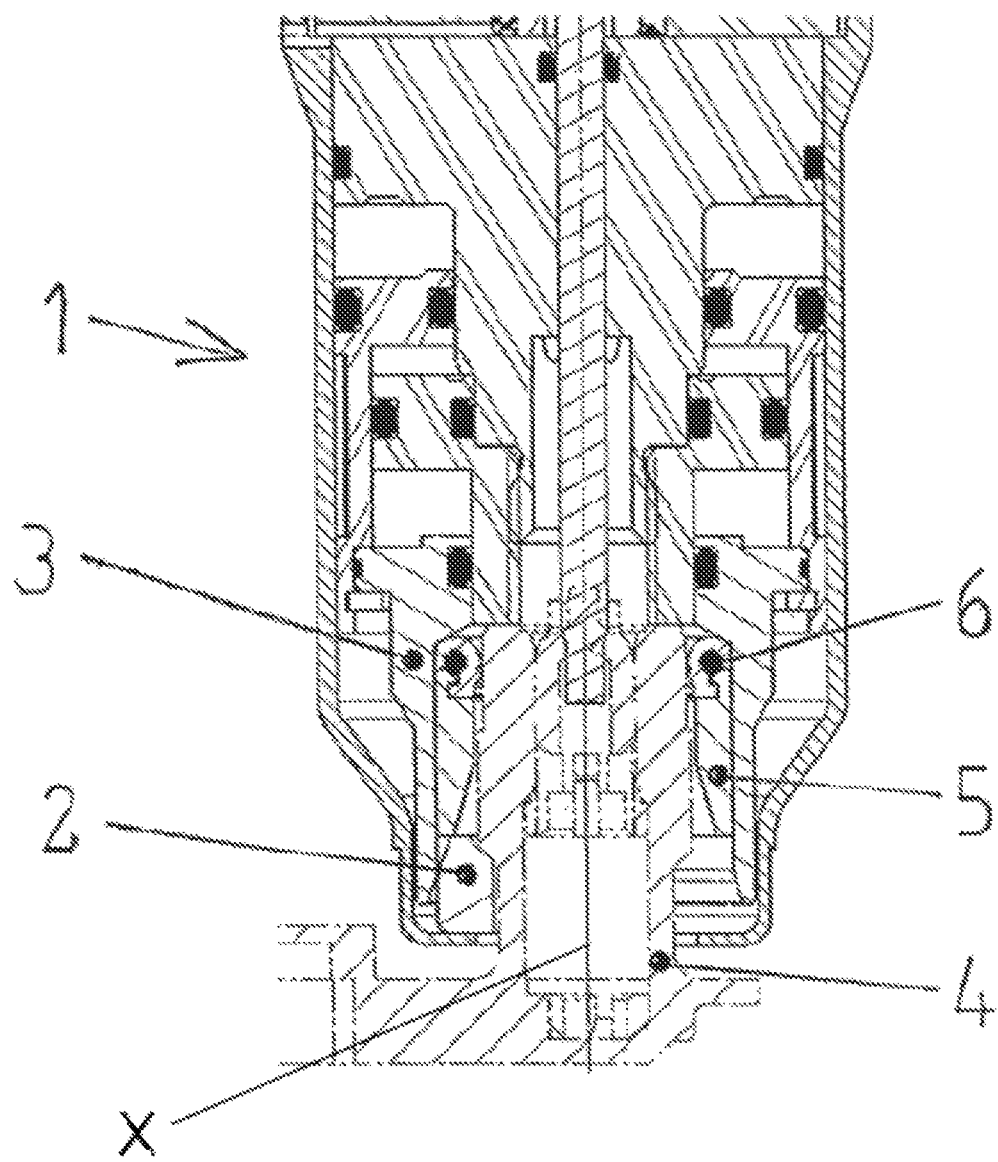
Figure 3:
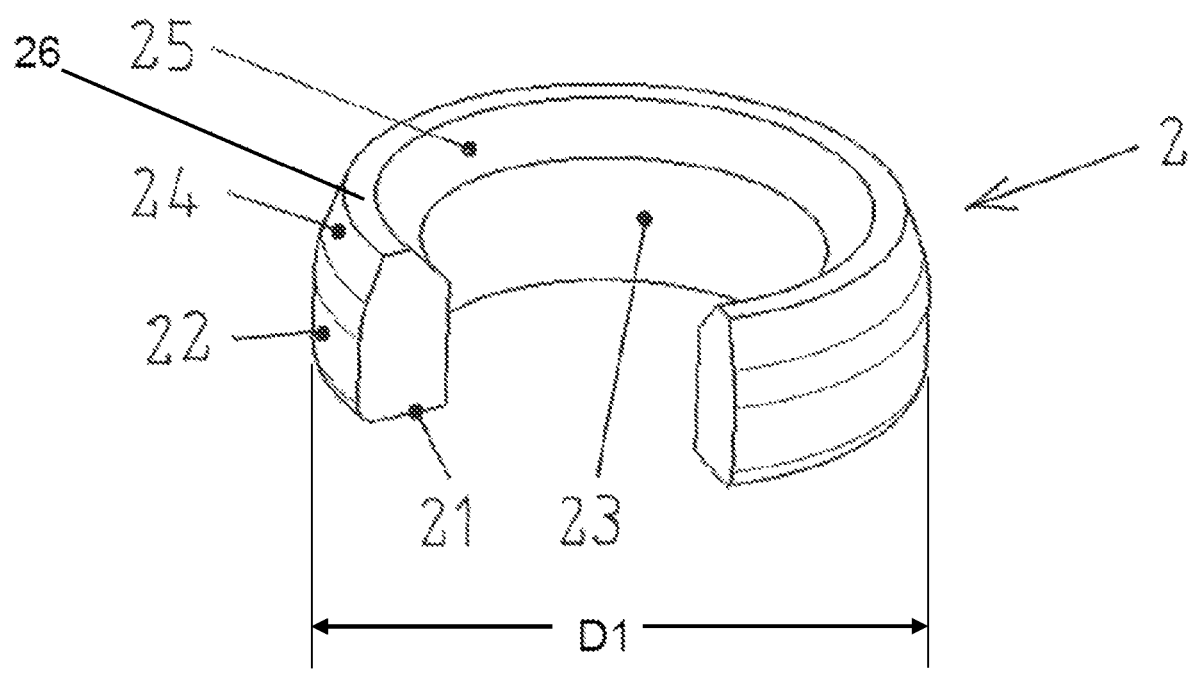

Exemplary embodiments are explained below with reference to the drawings, wherein:

FIG. 1 shows a partial view of a filling adapter with clamping element in the released state;

FIG. 2: shows the partial view of a filling adapter with clamping element shown in FIG. 1 in the clamped state;

FIG. 3 shows a perspective view and an enlarged view of a clamping element according to the disclosure.

DETAILED DESCRIPTION

Example embodiments will now be described more fully with reference to the accompanying drawings.

The drawing shows the basic structure of a filling adapter 1 for filling vehicles on assembly lines in the automotive industry, where vehicles can be filled with various operating materials. These operating materials are fed from filling systems via connecting lines and filling adapters 1 into circuits and containers of the vehicles (not shown here). The filling adapter 1 has at least one clamping element 2, which can be operated via a pneumatically or mechanically actuated clamping piston 3. Thus, the filling adapter 1 can be clamped onto specifically designed sections of the containers to be filled with a filling port 4 which is made of plastic, for example. During filling, the filling port 4 is held in this clamping position. Such a structure is known in principle, therefore only the components relevant in the present situation will be explained in more detail below.

Accordingly, the clamping element 2 has a partially circular contour, the specific design of which can be seen in FIG. 3. The closed circular ring contour on the clamping element 2 comprises an angle of approximately 280°.

Starting from a lower flat base surface 21, the clamping element has two side surfaces 22 and 23 which are arranged at right angles to the base surface and run parallel to each other. These two side surfaces 22; 23 merge at their end section 26, which is arranged opposite to the base surface 21, in each case into an actuating surface 24 or 25 extending obliquely upwards and inwards toward the end section 26.

The clamping element 2 has an outer diameter D1 on its outer side surface 22 which, relative to the associated section of the clamping piston 3, is smaller than an outer dimension D2 of the side surface of the clamping piston 3 facing away from the central longitudinal axis X of the filling port 4. At the same time, however, this diameter D1 is larger than an inner dimension D3 of the side surface of the clamping piston 3 facing the central longitudinal axis of the filling port 4.

FIG. 1 and FIG. 2 show that a seal carrier 5 is arranged in the filling adapter 1 above the clamping element 2 on the inner contour of the clamping piston 3. A container seal 6 is supported on said seal carrier 5.

With this structural design, the following functional sequence is realized during operation of a filling adapter 1:

When the clamping piston 3 moves downward, it impacts the outer actuating surface 24 of the clamping element 2. Due to the difference in diameter between the clamping piston 3 and the clamping element 2 as well as the orientation of the outer actuating surface 24, the clamping element 2 is increasingly pressed inwards as the clamping piston 3 moves. Due to the partially circular ring configuration of the clamping element 2, which is thus not a complete circular ring, the diameter of the clamping element 2 is reduced in that the element is compressed. Two oblique contours meet when the inner actuating surface 25 of the clamping element 2 contacts the filling port 4. This results in an upward movement of the filling port 4, which at the same time causes a compression with the container seal 6 and thus high leak tightness during filling.

After filling, the partially circular contour of the clamping element 2 and its relatively flexible material cause the clamping element 2 to relax automatically when the clamping piston 3 moves back. In this way, the seal carrier 5 prevents the clamping element 2 from jamming, and the filling port can subsequently be removed.

The foregoing description of the embodiment has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A filling adapter configured engage a filling port of a circuit or container to be filled in a filling operation on an assembly line for an automobile, wherein the filling adapter extends along a central longitudinal axis and comprises:

a pneumatically or mechanically actuated clamping piston movable along the central longitudinal axis;

a clamping element; and a seal carrier comprising a container seal positioned above the clamping element and within the clamping piston;

wherein the clamping element comprises a generally annular body having a constant cross-section and extending around the central longitudinal axis for an angle of about 280 degrees from a first cross-sectional end face to a second cross-sectional end face;

wherein the cross-section comprises a base surface extending laterally between a lower end of an outer side surface and a lower end of an inner side surface, the outer side surface extending upwardly from the base surface at a right angle, the inner side surface extending upwardly from the base surface at a right angle, a first actuating surface extending at a first oblique angle from an upper end of the outer side surface upwardly and inwardly toward the central longitudinal axis, a second actuating surface extending at a second oblique angle from an upper end of the inner side surface upwardly and outwardly away the central longitudinal axis, and a top surface opposite the base surface and extending laterally between an upper end of the first actuating surface and an upper end of the second actuating surface;

wherein the outer side surface of the clamping element comprises a first diameter;

wherein the clamping piston comprises an outer cylindrical surface comprising an outer diameter, an inner cylindrical surface and an inner conical lead surface extending from the inner cylindrical surface to a lower end of the clamping piston;

wherein the first diameter is less than the outer diameter and greater than the inner diameter;

wherein the filling adapter is configured such that downward movement of the clamping piston along the central longitudinal axis causes upward movement of the filling port to sealingly engage the filling port in the filling adapter;

wherein the movement of the clamping piston downward along the central longitudinal axis causes the lead surface of the clamping piston to engage the first actuating surface of the clamping element causing the clamping element to compress radially inwardly toward the longitudinal central axis causing the inner side surface to engage a first outer surface of the filling port and simultaneously causes the second actuating surface of the clamping element to engage a second conical outer surface of the filling port causing movement of the filling port upward along the central longitudinal axis and compressive engagement with the container seal; and wherein continued downward movement of the clamping piston along the central longitudinal axis causes the inner cylindrical surface of the clamping piston to engage the outer side surface of the clamping element.

\* \* \* \* \*